United States Patent [19]

Ohkubo

[11] Patent Number: 5,650,992

[45] Date of Patent: Jul. 22, 1997

[54] PHASE CHANGE OPTICAL DISC

[75] Inventor: Shuichi Ohkubo, Tokyo, Japan

[73] Assignee: NEC Corporation, Japan

[21] Appl. No.: 710,850

[22] Filed: Sep. 23, 1996

[30]    Foreign Application Priority Data

Sep. 27, 1995   [JP]   Japan .................................. 7-249208

[51] Int. Cl.$^6$ ...................................................... G11B 7/00
[52] U.S. Cl. ........................................................ 369/275.1
[58] Field of Search ........................ 369/13, 275.1–275.4

[56]                References Cited

U.S. PATENT DOCUMENTS 5,414,678   5/1995   Challener, IV ............................ 369/13
5,577,020   11/1996   Utsunomuya et al. ............... 365/275.3

FOREIGN PATENT DOCUMENTS 5-282705   10/1993   Japan .

*Primary Examiner*—Nabil Hindi
*Attorney, Agent, or Firm*—Hayes, Soloway, Hennessey, Grossman & Hage, P.C.

[57]                ABSTRACT

A phase change optical disk 10 is disclosed, which comprises a first dielectric layer 14, a recording layer 16, a second dielectric layer 18, a reflective layer 20, a third dielectric layer 22, and an ultraviolet cure resin layer 24, these layers being laminated in the mentioned order on a substrate 12. The substrate 12 is of polycarbonate or the like, the first to third dielectric layers 14, 18 and 22 are of $ZnS-SiO_2$ or the like, and the recording layer 16 is of GeSbTe or the like. The reflective layer 20 is of a tarnsparent material, such as silicon (Si) or germanium (Ge).

7 Claims, 9 Drawing Sheets

| THICKNESS OF THIRD DIELECTRIC LAYER | 2×\|Rc−Ra\|/\|Rc+Ra\| | Δφ | ABSORPTION COEFFICIENT OF REFLECTIVE LAYER |
|---|---|---|---|
| 55nm | 1.12 | 40deg. | 5.1% |
| 75nm | 1.10 | 20deg. | 5.5% |
| 85nm | 1.07 | 0deg. | 6.0% |
| 95nm | 1.05 | −28deg. | 6.4% |
| 115nm | 1.00 | −35deg. | 6.8% |

| THICKNESS OF THIRD DIELECTRIC LAYER | 2×\|Rc−Ra\|/\|Rc+Ra\| | Δφ | ABSORPTION COEFFICIENT OF REFLECTIVE LAYER |
|---|---|---|---|
| 80nm | 1.01 | 37.5deg. | 3.3% |
| 85nm | 1.02 | 18deg. | 3.3% |
| 90nm | 1.03 | −6.9deg. | 3.3% |
| 95nm | 1.03 | −35.3deg. | 3.3% |

| THICKNESS OF RECORDING LAYER | 2×\|Rc−Ra\|/\|Rc+Ra\| | Ac/Aa | Δφ |
|---|---|---|---|
| 10nm | 0.92 | 1.32 | −28deg. |
| 12nm | 1.04 | 1.24 | −13deg. |
| 20nm | 1.06 | 1.07 | 28.2deg. |
| 24nm | 0.93 | 1.03 | 29.8deg. |

| THICKNESS OF FIRST DIELECTRIC LAYER | 2×\|Rc-Ra\|/\|Rc+Ra\| | Ac/Aa | Δφ |
|---|---|---|---|
| 200nm | 1.01 | 1.24 | 13.2deg. |
| 210nm | 1.02 | 1.27 | 16.5deg. |
| 220nm | 0.98 | 1.31 | -11.3deg. |
| 230nm | 0.89 | 1.32 | -15.0deg. |
| 240nm | 0.80 | 1.32 | -28deg. |

FIG. 11

| THICKNESS OF REFLECTIVE LAYER | LIGHT ABSORPTION COEFFICIENT | C/N |
|---|---|---|
| 20nm | 5.8% | 55.1dB |
| 40nm | 6.2% | 55.1dB |
| 50nm | 7.5% | 55.0dB |
| 60nm | 10.0% | 53dB |
| 80nm | 15.3% | 51.5dB |

PHASE CHANGE OPTICAL DISC

BACKGROUND OF THE INVENTION

The present invention relates to optical data recording media with the optical state thereof variable by laser beam irradiation and, more particularly, to phase change optical disks.

Optical data recording media such as magneto-optical disks and phase change optical disks are well known in the art, which are capable of recording, erasing and reproducing the data by laser beam irradiation. Phase change optical disks permit ready construction of optical heads and ready over-writing. Researches and investigations for realizing higher density have been made.

For realizing higher density, the land/groove recording has been extensively researched, in which both land and groove are used for recording and reproduction. In the land/groove recording, reduction of cross-talk from adjacent land region or adjacent groove region is a serious problem. Regarding the cross-talk reduction, a technique of making the groove depth to be greater than a conventional value of λ/8 or a technique of removing influence of cross-talk in a signal processing, are well known in the art as described in Japanese Laid-Open Patent Publication No. 5-282705.

For obtaining equal recording and reproducing characteristics with both the land and groove regions based on the above techniques, it is necessary to make the optical phase difference $\Delta\phi=\phi a-\phi c$ between crystal state and amorphous state of a recording layer of the phase change optical disk to be approximately 0 degree.

For further density increase, a technique of combining the land/groove recording and mark edge recording, in which the data are provided at opposite ends of the recording mark, is promising. Particularly, in applications to the image recording or the like, high data transfer rates are desired, which dictates realization of high linear speed mark edge recording. In the mark edge recording, it is important how to reduce jitter. It is well known in the art that in order to realize high linear speed mark edge recording with the phase change optical disk by reducing the jitter in the over-writing, it is necessary to make the light absorption coefficient Aa of crystal to be higher than the light absorption coefficient As of amorphous.

FIG. 12 is a schematic sectional view showing a prior art phase change optical disk. As shown, the phase change optical disk 30 is obtained by laminating on a substrate 12 a first dielectric layer 14, a recording layer 16, a second dielectric layer 18 and a reflective layer 32 in the mentioned order. The substrate 12 is of polycarbonate (PC), the first and second dielectric layers 14 and 18 are of ZnS-SiO2, the recording layer 16 is of GeSbTe, and the reflective layer 32 is of aluminum.

With the prior art phase change optical disk 30 as stated, however, the reflective layer 32 which is made of aluminum or like metal, hardly transmits light. Therefore, it is difficult to control the light absorption coefficient of the recording layer 16. In addition, under a condition that Ac>Aa, it is difficult to increase (Rc–Ra) in order to ensure satisfactory signal quality or C/N or simultaneously meet $\Delta\phi=0$ in order to obtain the equal recording and reproducing characteristics with both land and groove.

FIG. 13 is a graph showing optical characteristics versus thickness of the first dielectric layer in the phase change optical disk shown in FIG. 12. Reference is now had to FIGS. 12 and 13.

Where the thickness of the first dielectric layer is in the neighborhood of 240 nm, the condition of Ac>Aa is satisfied. However, $\Delta\phi$ is greater than 70 degrees and cannot satisfy $\Delta\phi=0$. It is thus impossible to reduce cross-talk simultaneously in both the land and groove regions. Where the thickness of the first dielectric layer 14 is in the neighborhood of 170 nm, $\Delta\phi$ is relatively small, i.e., $\Delta\phi\approx30$ degrees. However, it is impossible to satisfy Ac>Aa.

As shown above, it is difficult to apply the prior art phase change optical disk 30 for both the land/groove recording and the high linear speed mark edge recording, and it is impossible to realize further density increase.

SUMMARY OF THE INVENTION

An object of the present invention is therefore to provide a phase change optical disk, which is applicable to both the land/groove recording and the high linear speed mark edge recording.

According to one aspect of the present invention, there is provided a phase change optical disk comprising a first dielectric layer, a recording layer, a second dielectric layer, and a reflective layer, these layers being laminated in the mentioned order on a substrate, the reflective layer being of a transparent material, and a third dielectric layer being provided on the reflective layer.

In the phase change optical disk, the following conditions is preferred:

$2(Rc-Ra)/(Rc+Ra)>0.9;$ $Ac/Aa>1.05;$ and $\phi a-\phi c<30$ degrees, where Rc, Ac and $\phi c$ are a reflectivity, the light absorption coefficient and an optical phase, respectively, as optical characteristics when the recording layer is in a crystalline state, and Ra, Aa and $\phi a$ are a reflectivity, a light absorption coefficient and an optical phase, respectively, as optical characteristics when the recording layer is in a crystalline state. The transparent material is silicon or germanium. An ultraviolet cure resin layer is provided on the third dielectric layer. The light absorption coefficient of the reflective layer when the recording layer is in the crystalline state is 10% or below. The substrate is of polycarbonate, the first, second and third dielectric layers are of ZnS-SiO$_2$, SiO$_2$, Ta$_2$O$_5$, SiN or AlN, the recording layer is of GeSbTe or AgInSbTe.

By using a transparent material such as silicon or germanium as the reflective layer, it is possible to facilitate the light absorption coefficient control and realize Ac>Aa. By using the third dielectric material, it is possible to make the phase difference $\Delta\phi$ to be approximately 0 degree by increasing the crystal/amorphous reflectivity difference while maintaining the recording signal quality. By setting the light absorption coefficient of the reflective layer to be 10% or below, it is possible to prevent reduction of the cooling speed and form satisfactory amorphous mark.

BRIEF DESCRIPTION OF THE DRAWINGS

FIGS. 11 shows an example of optical characteristics and recording characteristics with respect to the thickness of the reflective layer in the phase change disk shown in FIG. 1;

PREFERRED EMBODIMENTS OF THE INVENTION

Figure 1:
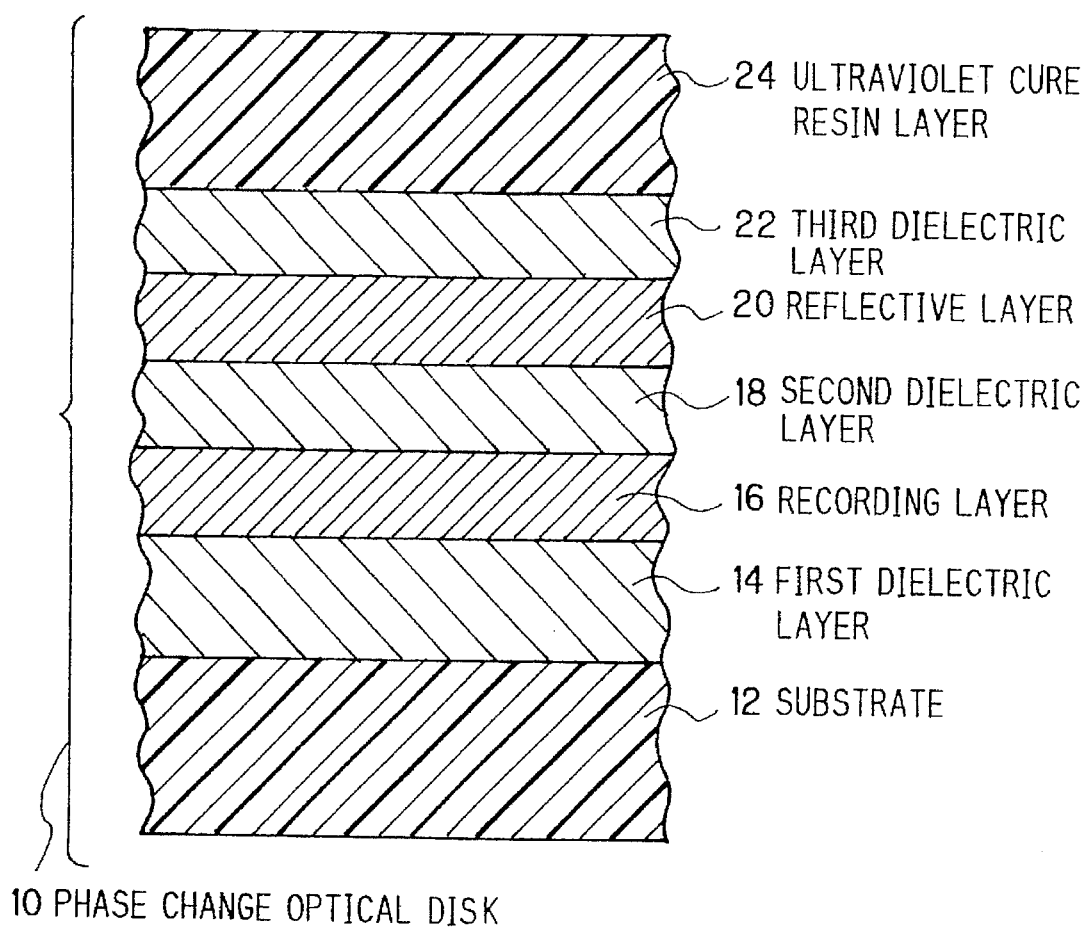
FIG. 1 is a schematic sectional view showing an embodiment of the phase change optical disk according to the present invention.

FIG. 1 is a schematic sectional view showing an embodiment of the phase change optical disk according to the present invention. Referring to the Figure, a phase change optical disk 10 is shown, which is obtained by laminating on a substrate 12 a first dielectric layer 14, a recording layer 16, a second dielectric layer 18, a reflective layer 20, and a third dielectric layer 22 in the mentioned order. An ultraviolet cure resin layer 24 is provided as a protective layer on the third dielectric layer 22.

The substrate 12 is of polycarbonate (PC). The first to third dielectric layers 14, 18 and 22 are of $ZnS-SiO_2$, $SiO_2$, $Ta_2O_5$, SiN, AlN, etc., the recording layer 16 is of GeSbTe, AgInSbTe, etc., and the reflective layer 20 is of a transparent material such as silicon (Si) or germanium (Ge).

Figure 2:
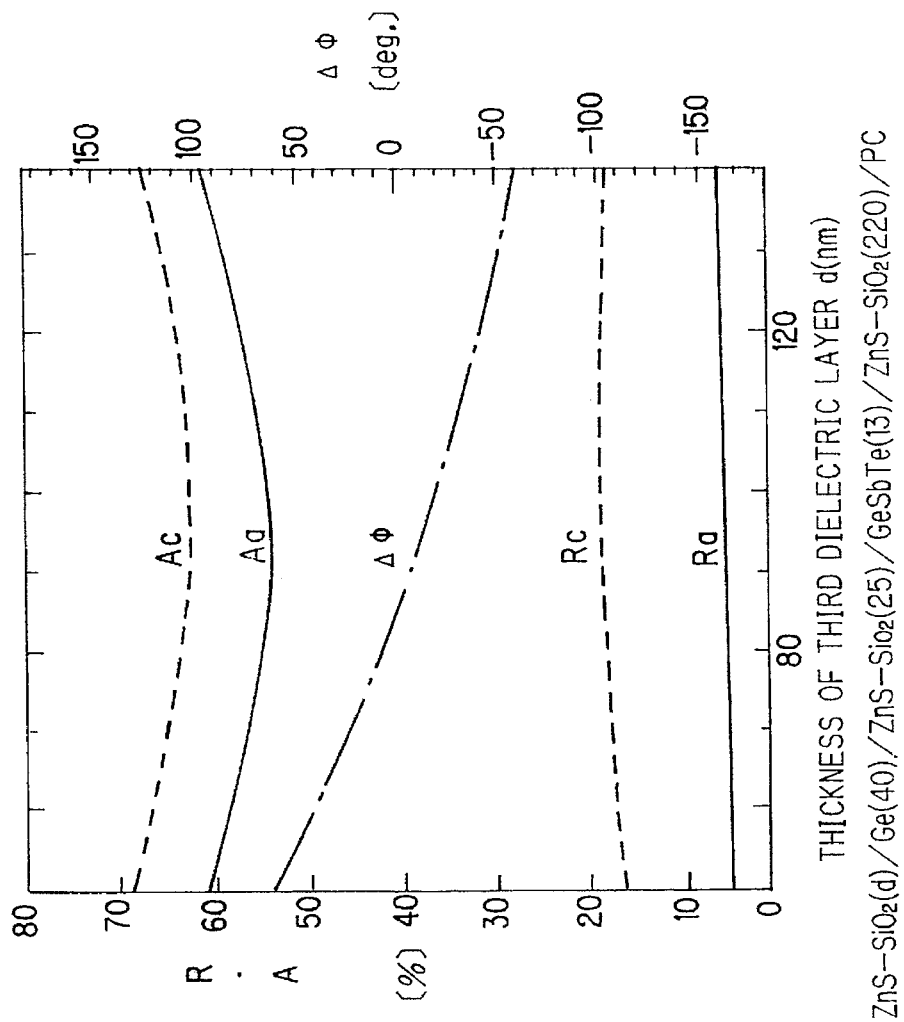
FIGS. 2 to 4 show exemplary optical characteristics or recording characteristics versus thickness of the third dielectric layer in the phase change optical disk shown in FIG. 1.
Figures 3, 4:
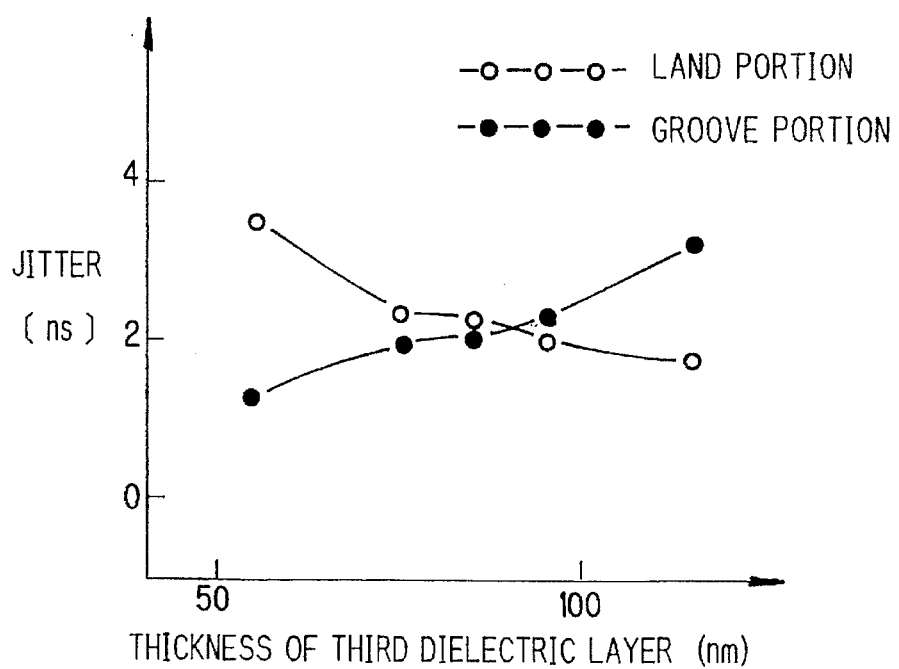

FIGS. 2 to 4 show exemplary optical characteristics or recording characteristics versus thickness of the third dielectric layer in the phase change optical disk shown in FIG. 1. Specifically, FIG. 2 is a graph showing optical characteristics where $\Delta\phi$ represents a phase difference, R: reflectivity coefficient, and A: absorption coefficient. FIG. 3 is a table showing optical characteristics, and FIG. 4 is a graph showing recording characteristics. Reference is hereinafter had to FIGS. 1 to 4.

The first to third dielectric layers 14, 18 and 22 were formed by using $ZnS-SiO_2$, the recording layer 16 was formed by using $Ge_2Sb_2Te_5$, and the reflective layer 20 was formed by using Ge. As the substrate 12 was used one made of polycarbonate (PC) and having a thickness of 12.2 mm, a groove pitch of 1.4 μm and a groove depth of 75 nm. The thickness of the first dielectric layer 14 was set to 220 nm, the thickness of the recording layer 16 was set to 13 nm, the thickness of the second dielectric layer was set to 25 nm, the thickness of the reflective layer 20 was set to 40 nm, and the thickness of the third dielectric layer 22 was set to 50 to 140 nm. These layers were laminated by sputtering in the mentioned order. After the lamination, the ultraviolet cure resin layer 24 was spin coated to a thickens of 10 μm. In FIG. 3, the thickness of the third dielectric layer 22 is shown as five different values, i.e., 55, 75, 85, 95 and 115 nm.

As shown in FIGS. 2 and 3, $\Delta\phi$ can be varied as desired by varying the thickness d of the third dielectric layer while maintaining the condition Ac>Aa. Since it is possible to increase 2(Rc−Ra/(Rc+Ra), high signal quality can be ensured. As shown in FIG. 3, $\Delta\phi$ can be varied as desired, and the individual phase change optical disks have substantially the same optical characteristics except $\Delta\phi$.

FIG. 4 shows results of jitter measurement during overwriting by using an optical head at a wavelength of 685 nm and with an objective lens N.A. of 0.55 by setting a linear speed of 15 m/s after initialization. The measurement was made by over-writing the signal at 5.2 MHz over the signal at 3.6 MHz by under conditions of a recording frequency of 3.6 MHz and a duty ratio of 50% and also of a recording frequency of 5.2 MHz and a duty ratio of 50%. As shown in FIGS. 3 and 4, it was observed that satisfactory characteristics of both land and groove are obtainable under a condition of $\Delta\phi<30$ degrees.

Figures 5, 6:
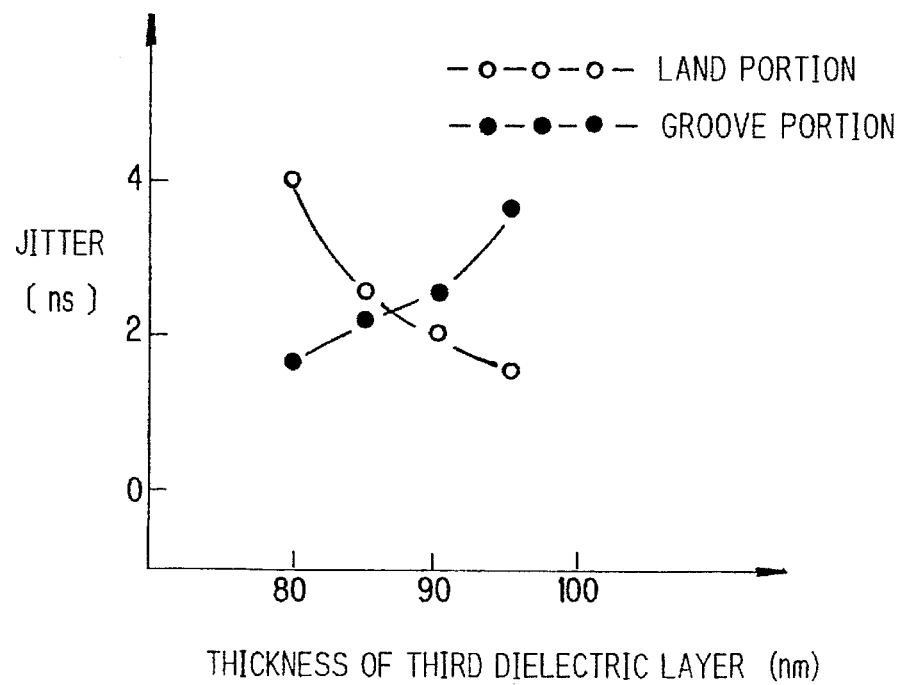
FIGS. 5 and 6 show a different example of optical characteristics and recording characteristics with respect to the thickness of the third dielectric layer in the phase change optical disk as shown in FIG. 1.

FIGS. 5 and 6 show a different example of optical characteristics and recording characteristics with respect to the thickness of the third dielectric layer in the phase change optical disk as shown in FIG. 1. FIG. 5 is a table showing the optical characteristics, and FIG. 6 is a graph showing the recording characteristics. Reference is now had to FIGS. 1, 5 and 6.

In this example, the same materials were used for the individual layers as those in the preceding first example except that Si was used for the reflective layer 20. On the substrate 12 the first dielectric layer 14 was laminated to a thickness of 230 nm, the recording layer 16 was laminated to 12 nm, the second dielectric layer 18 was laminated to 25 nm, then the reflective layer 20 was laminated to 55 nm, and the third dielectric layer 22 was laminated to 80, 85, 90 and 95 nm. The individual layers were laminated by sputtering. After the lamination, the ultraviolet cure resin layer 24 was spin coated to a thickness of 10 μm. As shown in FIG. 5, the individual phase change optical disks have substantially the same optical characteristics except for $\Delta\phi$. The recording characteristics shown in FIG. 6 are results of measurements made under the same conditions as in the first example. As shown in FIGS. 5 and 6, it was observed that satisfactory characteristics of both land and groove are obtainable under a condition of $\Delta\phi<30$ degrees.

Figures 7, 8:
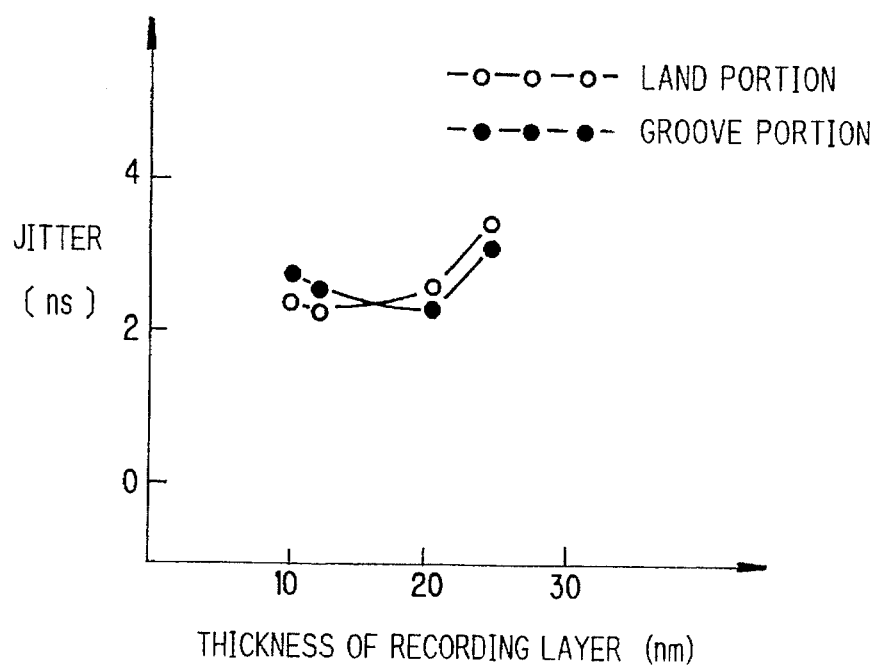
FIGS. 7 and 8 show a further example of optical characteristics and recording characteristics with respect to the thickness of the recording layer in the phase change optical disk shown in FIG. 1.

FIGS. 7 and 8 show a further example of optical characteristics and recording characteristics with respect to the thickness of the recording layer in the phase change optical disk shown in FIG. 1. FIG. 7 is a table showing the optical characteristics, and FIG. 8 is a graph showing the recording characteristics. Reference is now had to FIGS. 1, 7 and 8.

In this example, the same materials are used for the individual layers as in the first example. On the substrate 12 the first dielectric layer 14 was laminated to a thickness of 220 nm, the recording layer 16 was laminated to 10, 12, 20 and 24 nm, the second dielectric layer 18 was laminated to 25 nm, then the reflective layer 20 was laminated to 40 nm, and the third dielectric layer 22 was laminated to 85 nm. The individual layers were laminated by sputtering. After the lamination, the ultraviolet cure resin layer 24 was spin coated to a thickness of 10 μm. As shown in FIG. 7, the individual phase change optical disks all met a condition of $\Delta\phi<30$ degrees, but were different in the value of Ac/Aa. The recording characteristics shown in FIG. 8 are results of measurements made under the same conditions as in the first example. As shown in FIGS. 7 and 8, it was observed that satisfactory characteristics of both land and groove are obtainable under a condition of Ac/Aa>1.05.

Figures 9, 10:
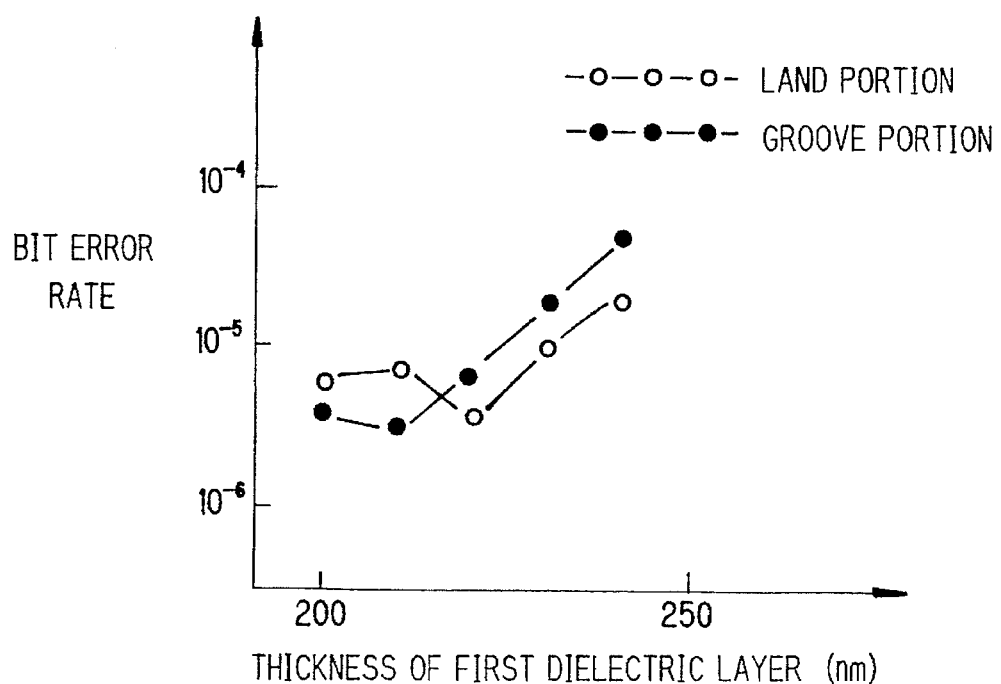
FIGS. 9 and 10 show an example of optical characteristics and recording characteristics with respect to the thickness of the first dielectric layer in the phase change disk shown in FIG. 1.
Figure 12:
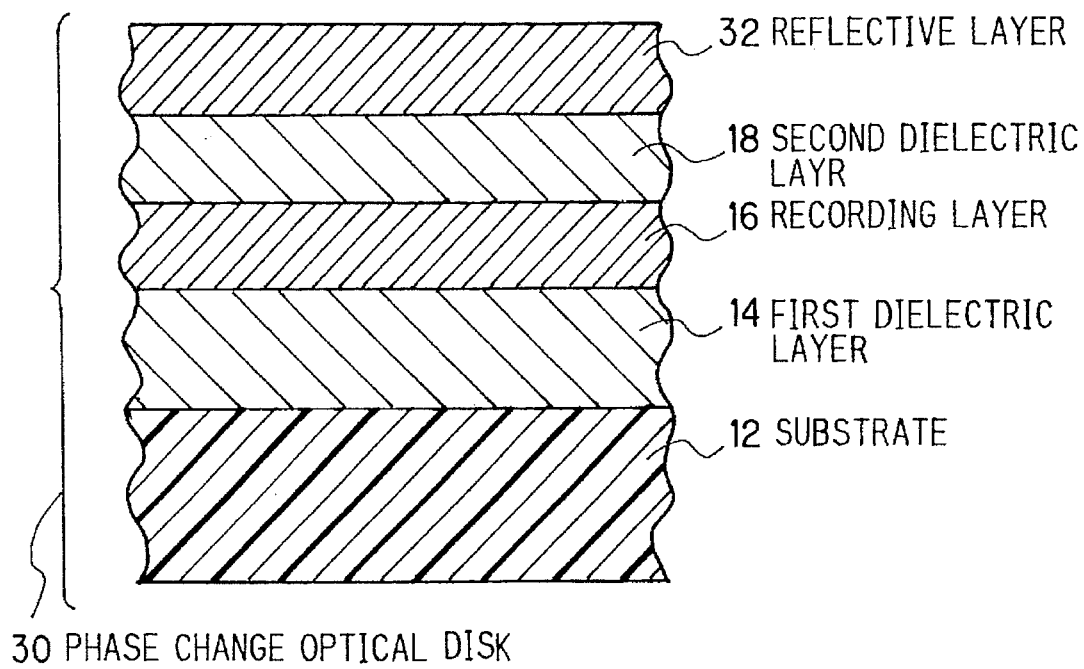
FIG. 12 is a schematic sectional view showing a prior art phase change optical disk.
Figure 13:
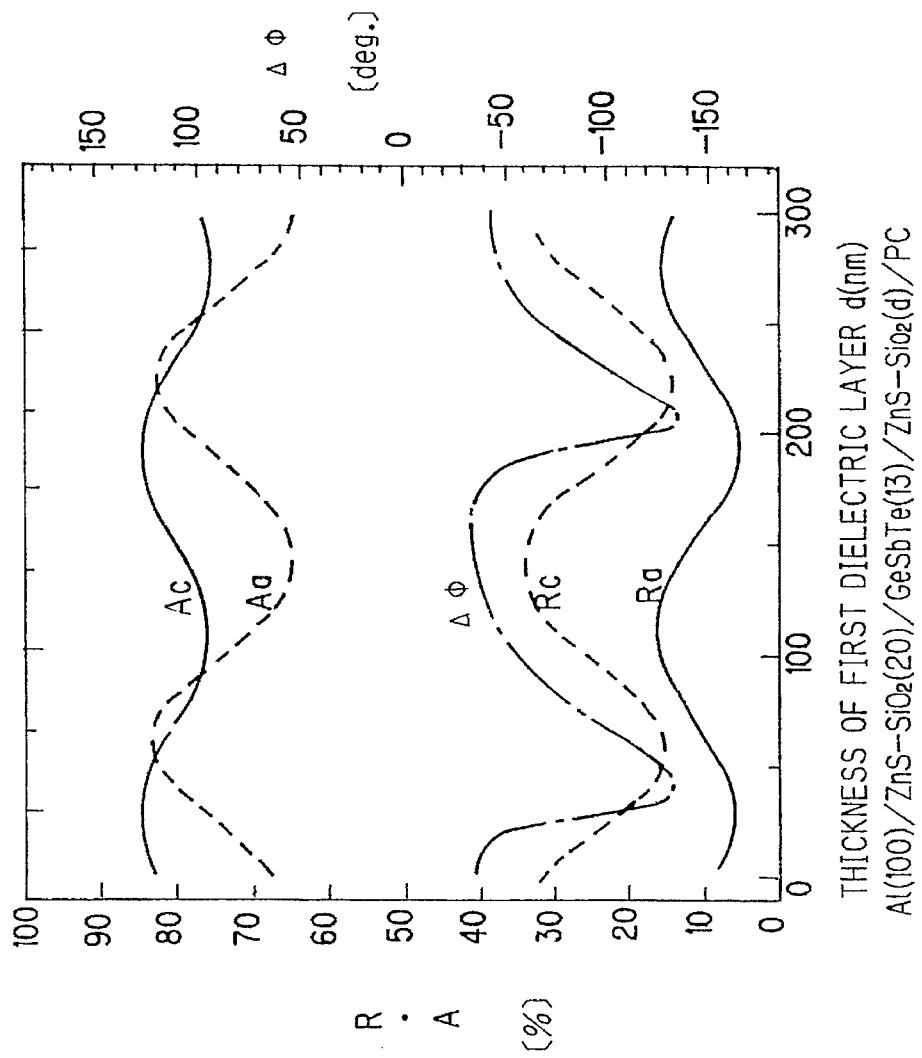
FIG. 13 is a graph showing optical characteristics versus thickness of the first dielectric layer in the phase change optical disk shown in FIG. 12.

FIGS. 9 and 10 show an example of optical characteristics and recording characteristics with respect to the thickness of the first dielectric layer in the phase change disk shown in FIG. 1. FIG. 9 is a table showing the optical characteristics, and FIG. 10 is a graph showing the recording characteristics. Reference is now had to FIGS. 1, 9 and 10.

In this example, the same materials were use for the individual layers as in the second example. On the substrate 12 the first dielectric layer 14 was laminated to a thickness of 200, 210, 220, 230, 240 nm, the recording layer 16 was laminated to 10 nm, the second dielectric layer 18 was laminated to 20 nm, then the reflective layer 20 was laminated to 50 nm, and the third dielectric layer 22 was laminated to 60 nm. The individual layers were laminated by sputtering. After the lamination, the ultraviolet cure resin layer 24 was spin coated to a thickness of 10 μm.

As shown in FIG. 9, the individual phase change optical disks all met conditions Ac/Aa>1.05 and Δϕ<30 degree, but were different in values 2(Rc−Ra)/(Rc+Ra). For the recording characteristics, (1−7) modulated data was recorded and the error rate was measured by using an optical head with a wavelength of 685 nm and an objective lens N.A. of 0.55 at a linear speed of 15 m/s after initialization. As shown in FIGS. 9 and 10, suitable error rate smaller than $1 \times 10^{-5}$ for 2(Rc−Ra)/(Rc+Ra).

FIGS. 11 show an example of optical characteristics and recording characteristics with respect to the thickness of the reflective layer in the phase change disk shown in FIG. 1.

In this example, the same materials were use for the individual layers as in the first example. On the substrate 12 the first dielectric layer 14 was laminated to a thickness of 220 nm, then the recording layer 16 was laminated to 13 nm, then the second dielectric layer 18 was laminated to 25 nm, then the reflective layer 20 was laminated to 20, 40, 50, 60 and 80 nm, and then the third dielectric layer 22 was laminated to 85 nm. The individual layers were laminated by sputtering. After the lamination, the ultraviolet cure resin layer 24 was spin coated to a thickness of 10 μm.

As shown in FIG. 11, the individual phase change optical disks all met conditions 2(Rc−Ra)/(Rc+Ra)>0.9 and Ac/Aa>1.0, but were different in the light absorption coefficient of Ge in the amorphous state. For the recording characteristics, the C/N in over-writing was measured by using an optical head with a wavelength of 685 nm and an objective lens N.A. of 0.55 at a linear speed of 15 m/s after initialization. The recording frequency was set to 3.6 MHz, and the duty ratio was set to 50%. As shown in FIG. 11, the C/N is deteriorated when the light absorption coefficient of Ge as the reflective layer 20 exceeds 10%.

As has been described in the foregoing, with the phase change optical disk according to the present invention, which comprises the first dielectric layer, the recording layer, the second dielectric layer, the reflective layer of a transparent material, and the third dielectric layer, these layers being laminated in the mentioned order on a substrate, the reflective layer facilitates light absorption coefficient control and permits Ac>Aa to be realized. In addition, the third dielectric layer permits increasing the reflectivity between crystal and amorphous, thus making the phase difference to be approximately 0 degree while maintaining high recording signal quality. Moreover, by making the light absorption coefficient of the reflective layer to be 10% or below, it is possible to prevent reduction of the cooling speed and obtain satisfactory amorphous mark formation. The present invention is thus applicable to both land/groove recording and high linear speed mark edge recording, and permits realizing density increase and speed increase.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A phase change optical disk comprising a first dielectric layer, a recording layer, a second dielectric layer, and a reflective layer, these layers being laminated in the mentioned order on a substrate, the reflective layer being of a transparent material, and a third dielectric layer being provided on the reflective layer.

2. The phase change optical disk according to claim 1, which meets conditions of:

$$2(Rc-Ra)/(Rc+Ra) > 0.9;$$

$$Ac/Aa > 1.05;\ \text{and}$$

$$\phi a - \phi c < 30\ \text{degrees},$$

where Rc, Ac and ϕc are a reflectivity, the light absorption coefficient and an optical phase, respectively, as optical characteristics when the recording layer is in a crystalline state, and Ra, Aa and ϕa are a reflectivity, a light absorption coefficient and an optical phase, respectively, as optical characteristics when the recording layer is in an amorphous state.

3. The phase change optical disk according to claim 1, wherein the transparent material is silicon.

4. The phase change optical disk according to claim 1, wherein the transparent material is germanium.

5. The phase change optical disk according to claim 1, wherein an ultraviolet cure resin layer is provided on the third dielectric layer.

6. The phase change optical disk according to claim 1, wherein the light absorption coefficient of the reflective layer when the recording layer is in the crystalline state is 10% or below.

7. The phase change optical disk according to claim 1, wherein the substrate is of polycarbonate, the first, second and third dielectric layers are of $ZnS\text{-}SiO_2$, $SiO_2$, $Ta_2O_5$, SiN or AlN, the recording layer is of GeSbTe or AgInSbTe.

* * * * *